United States Patent Office.

WILLIAM H. ST. JOHN AND PETER CARTWRIGHT, OF NEW YORK, N. Y.

Letters Patent No. 109,268, dated November 15, 1870.

IMPROVEMENT IN PURIFYING ILLUMINATING-GASES.

The Schedule referred to in these Letters Patent and making part of the same.

We, WILLIAM H. ST. JOHN and PETER CARTWRIGHT, both of the city, county, and State of New York, have discovered and invented a new Method of Purifying Illuminating-Gas, of which the following is a specification.

This invention is based on the fact that oxide of iron, as ordinarily employed, soon becomes exhausted, owing to its texture and condition.

After numerous and long-continued experiments, we have discovered that when oxide of iron, in the form known as amorphous granular limonite, and which occurs native on Staten Island, in the State of New York, is used, it is not subject to this objection.

Purifiers charged with this material remain in operation for a far longer period, and the purification of the gas is much more perfect and reliable.

The nature of our invention consists in the using, for charging gas-purifiers, either alone or in admixture with other materials, of a certain granular ocher-like mineral, which is found in rocks, considered of mesozoic or secondary age, on Staten Island.

This material is peculiar both in its chemical composition and in its mechanical structure. Chemically it is composed almost altogether of the species of mineral known as limonite, containing from twelve to fourteen per cent. of combined water. Mechanically it is both granular and amorphous, soft and highly porous.

It is in consequence of this altogether peculiar combination of properties that our experiments, made binations upon a great number of native oxides of iron, have proved this Staten Island species to surpass, to a high degree, all others in the convenience and rapidity of its action in gas-purification.

Bog ores and ochers, or limnates of iron, in consequence of their compactness and their impurities, we find almost inert in comparison, and the ores of the primary rocks or crystalline schists, as those of Salisbury, in Connecticut, and the like, which are largely composed of the species turgite, containing but about five per cent. of water, and which are very hard and compact, we find to be very inferior to the Staten Island species.

Other advantages of the Staten Island mineral may be stated as follows :

In the charging of purifiers we find it unnecessary to crush or sift the crude mineral, because, after revivification in the air and the manipulations attendant thereon, the lumps all fall down to a granular form.

We prefer usually, however, to mix it before use with iron borings, turnings, or filings, according to our former patent of April 7, 1868, No. 76,544. In all cases we moisten the material with water before charging into the boxes.

Also, in charging the purifying-boxes it is unnecessary to use trays, in consequence of the natural granular nature of this mineral; but the crude ore is shoveled at once into the boxes, on a perforated false bottom, to an appropriate depth.

No admixture with straw or saw-dust is required in the case of the Staten Island mineral.

Claim.

We claim as our invention—

The improved process herein described for purifying illuminating-gas, the same consisting in treating the same with oxide of iron, having the texture and composition above set forth.

WM. H. ST. JOHN.
PETER CARTWRIGHT

Witnesses:
RICHD. W. MOTT,
THEO. M. TUTHILL.